(12) United States Patent
Tamaki

(10) Patent No.: US 8,633,931 B2
(45) Date of Patent: Jan. 21, 2014

(54) IMAGE PROCESSING METHOD, RECORDING MEDIUM STORING PROGRAM THEREOF AND IMAGE PROCESSING APPARATUS

(75) Inventor: Tetsuya Tamaki, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 783 days.

(21) Appl. No.: 12/363,638

(22) Filed: Jan. 30, 2009

(65) Prior Publication Data

US 2009/0201296 A1    Aug. 13, 2009

(30) Foreign Application Priority Data

Jan. 31, 2008 (JP) ................... 2008-020522
Dec. 26, 2008 (JP) ................... 2008-331842

(51) Int. Cl.
*G06T 11/00* (2006.01)
*G06K 9/32* (2006.01)
*H04N 1/40* (2006.01)

(52) U.S. Cl.
USPC ............................ 345/467; 382/296; 358/3.28

(58) Field of Classification Search
USPC .......................................... 345/467; 358/3.28
See application file for complete search history.

(56) References Cited

U.S. PATENT DOCUMENTS

| | | | | |
|---|---|---|---|---|
| 4,755,955 A | * | 7/1988 | Kimura et al. | 715/202 |
| 4,924,411 A | * | 5/1990 | Kashiwagi | 345/639 |
| 5,539,868 A | * | 7/1996 | Hosoya et al. | 345/471 |
| 5,590,247 A | * | 12/1996 | Mikuni | 358/1.11 |
| 5,947,619 A | * | 9/1999 | Kurashina et al. | 400/615.2 |
| 5,949,906 A | * | 9/1999 | Hontani et al. | 382/177 |
| 5,995,963 A | * | 11/1999 | Nanba et al. | 1/1 |
| 6,381,027 B1 | * | 4/2002 | Tanaka | 358/1.11 |
| 6,498,659 B1 | * | 12/2002 | Konishi | 358/1.18 |
| 7,027,179 B2 | * | 4/2006 | Mori | 358/1.18 |
| 7,052,196 B2 | * | 5/2006 | Ueno et al. | 400/615.2 |
| 7,149,451 B2 | * | 12/2006 | Uchida et al. | 399/81 |
| 7,450,895 B2 | * | 11/2008 | Oomura et al. | 399/366 |
| 7,495,803 B2 | * | 2/2009 | Natori | 358/1.9 |
| 7,738,143 B2 | * | 6/2010 | Ishimoto et al. | 358/3.28 |

(Continued)

FOREIGN PATENT DOCUMENTS

| JP | 2001-103271 A | 4/2001 |
|---|---|---|
| JP | 2004-005682 A | 1/2004 |

(Continued)

*Primary Examiner* — M Good Johnson
(74) *Attorney, Agent, or Firm* — Kilpatrick Townsend & Stockton LLP

(57) ABSTRACT

This ground tint image generating routine sets an arrangement area where a plurality of character strings are arranged, sets an arrangement start line of a character string at least within the arrangement area (S100), arranges a plurality of character strings from a start position of the arrangement start line in a predetermined direction in a predetermined order, arranges the character string from a start position of the arrangement start line of a next line (S170 to S210) when a character string to be arranged next is outside of the arrangement area, and generates a ground tint image (background image) in an area including the arrangement start line by using a plurality of character strings arranged within the arrangement area (S220).

13 Claims, 14 Drawing Sheets

(56) References Cited

U.S. PATENT DOCUMENTS

| | | | |
|---|---|---|---|
| 7,742,196 B2* | 6/2010 | Uchida et al. | 358/3.28 |
| 7,847,980 B2* | 12/2010 | Aritomi et al. | 358/3.28 |
| 7,957,033 B2* | 6/2011 | Mori | 358/3.28 |
| 8,159,723 B2* | 4/2012 | Yamada | 358/3.28 |
| 8,184,337 B2* | 5/2012 | Sakai | 358/1.9 |
| 2005/0078993 A1* | 4/2005 | Oomura et al. | 399/366 |
| 2006/0067759 A1* | 3/2006 | Osaka | 399/366 |
| 2006/0158688 A1* | 7/2006 | Mori | 358/1.15 |
| 2006/0263132 A1* | 11/2006 | Yamamoto et al. | 400/62 |

FOREIGN PATENT DOCUMENTS

| | | |
|---|---|---|
| JP | 2004-288220 A | 10/2004 |
| JP | 2005-210538 A | 8/2005 |
| JP | 2006-091956 A | 4/2006 |
| JP | 2006-345314 A | 12/2006 |
| JP | 2006-345383 A | 12/2006 |
| JP | 2007-115078 A | 5/2007 |
| JP | 2007-115126 A | 5/2007 |
| JP | 2007-251843 A | 9/2007 |
| JP | 2007-310432 A | 11/2007 |

* cited by examiner

IMAGE PROCESSING METHOD, RECORDING MEDIUM STORING PROGRAM THEREOF AND IMAGE PROCESSING APPARATUS

The entire disclosure of Japanese Patent Application Nos: 2008-020522, filed Jan. 31, 2008 and 2008-331842, filed Dec. 26, 2008 are expressly incorporated by reference herein.

BACKGROUND OF THE INVENTION

1. Field of the Invention

The present invention relates to an image processing method, a program thereof, and an image processing apparatus.

2. Description of the Related Art

Conventionally, as an image processing method, a method of generating a watermark image in which a plurality types of additional images (also called ground tint image, watermark, or stamp mark) are overlapped on a main image, each additional image is arranged in its own line to generate an image where the additional images are arranged over a plurality of lines, and the image is rotated and cut to the size of the main image, has been proposed (for example, refer to Patent Document 1: Japanese Unexamined Patent Application Publication No. 2005-210538 (FIG. 32)). In addition, a method of controlling the additional image not to protrude from the specified area even after a rotation of the image, has also been proposed in which an additional image is overlapped on a main image, formed so as to have a tile shape, and rotated to an inputted rotation angle, the location and size of the additional image being determined so as to be within a specified area, and the tile-shaped additional image is arranged at the determined location (for example, refer to Patent Document 2: Japanese Unexamined Patent Application Publication No. 2001-103271 (FIG. 7)).

However, in the image processing method described in Patent Document 1, since a character string protruding from an edge of image is not considered and characters are always cut at the edge of the image, it may be difficult to read a ground tint image. In addition, in the image processing method described in Patent Document 2, since a last character of an arranged character string and a start position of a first character of a character string arranged next to the former character string are often out of alignment, it may be difficult to read a plurality of arranged character strings as a series of character strings. Furthermore, a case in which a plurality of types of character strings have different lengths is not considered. Therefore, when arranging a plurality of character strings having different lengths, a character string including a small number of characters has a small tile size, and a character string including a large number of characters has a large tile size. Thereby, the sizes of the tile shapes of the character strings differ from each other. If they are arranged without being adjusted, character strings including a larger number of characters occupy a larger area, and if each character string has almost the same area, a tile of a character string including a larger number of characters has smaller characters. As a result, it may be difficult to read a ground tint image.

SUMMARY OF THE INVENTION

The present invention is made in view of the above problems, and it is a main object of the present invention to provide an image processing method, a program, and an image processing apparatus thereof, the image processing method being able to further improve readability of character strings in a background image where a plurality of character strings are arranged.

The present invention adopts the following procedure to achieve the above object.

The image processing method of the present invention is an image processing method in which a computer generates a background image where a plurality of character strings are arranged over a plurality of lines, the image processing method including:

(a) a step for setting an arrangement area where the character string is arranged;

(b) a step for setting an arrangement start line of the character string at least within the arrangement area;

(c) a step for arranging the plurality of character strings from a start position of the arrangement start line in a predetermined direction in a predetermined order, and arranging the character string from a start position of the arrangement start line of the next line when a character string to be arranged next is outside of the arrangement area set in step (a); and (d) a step for generating the background image in an area including the arrangement start line by using the plurality of character strings arranged within the arrangement area in the step (c).

In the image processing method, an arrangement area where a plurality of character strings are arranged is set, an arrangement start line of a character string is set at least within the arrangement area, a plurality of character strings from a start position of the arrangement start line are arranged in a predetermined direction in a predetermined order, the character string is arranged from a start position of the arrangement start line of the next line when a character string to be arranged next is outside of the arrangement area, and a background image is generated in an area including the arrangement start line by using a plurality of character strings arranged within the arrangement area. In this way, as a plurality of character strings are arranged from the arrangement start line set at least within the arrangement area in a predetermined direction, the arranged character strings are more difficult to be cut, and as a plurality of character strings are aligned to form a line, the character strings can easily be to read as a single string. Therefore, in a background image where a plurality of character strings are arranged, it is possible to further improve readability of the character strings in the background image. Here, "a plurality of character strings" includes a case of a plurality of same character strings, and a case of a plurality of types of character strings. In addition, "a predetermined order for arranging a plurality of character strings" may include a case in which first, second, and third character strings are aligned in first, second, and third lines respectively when there are the first, second and third character strings, or the first, second, and the third character strings may be aligned in all the lines. Moreover "when a character string to be arranged next is outside of the arrangement area" includes a case in which a currently arranged character string is outside of the arrangement area. The "background image" may be a ground tint image.

In the image processing method of the present invention, in the step (b), an arrangement start line may be set at least in a left edge portion of the set arrangement area, and in the step (c), the character string may be set in a rightward direction from the arrangement start line as the predetermined direction. As, generally a character string is mostly written from left to right, the character string can be more easily read in this manner.

In the image processing method of the present invention, in the step (a), the arrangement area may be set in a rectangular area based on a size of a main image on which the background image is overlapped. By doing so, the background image is generated in a size based on the main image, so that the background image may be generated relatively efficiently. Here, "a rectangular area based on the size of a main image" may be, for example, a rectangular area having the same size as the main image, or a rectangular area having a size formed by removing a predetermined margin from the size of the main image, for example, a rectangular area a slightly smaller than the size of the main image. Furthermore, in the image processing method of the present invention, in the step (a), the arrangement area may be set in a predetermined width range. By changing the width range, for example, the arrangement may be changed such that a plurality of types of character strings are arranged to be more evenly appeared. At this time, "a predetermined width range" may be a range which is not related to the size of the main image on which the background image is overlapped.

In the image processing method of the present invention, in the step (c), when the arranged character string protrudes from the arrangement area, a character string next to the protruding character string may be arranged at the top of the next line. When doing so, as an order of repetition of a plurality of character strings may be maintained, a plurality of character strings may be easily read. Or, in the step (c), when the arranged character string protrudes from the arrangement area, if a protruding area is greater than a predetermined ratio, the protruding character string may be arranged at the top of the next line, and if the protruding area is smaller than the predetermined ratio, a character string next to the protruding character string is arranged at the top of the next line. By doing so, as a character string which protrudes from the arrangement area, in other words, a character string which is cut off from the background image, is arranged in the next line, generation of a character string which is cut off from the background image and cannot be read may be further suppressed. As a result, a plurality of character strings may be more reliably read. Furthermore, in the step (c), when the arranged character string protrudes from the arrangement area, a character string different from a top character string in the current line may be arranged at the top of the next line. By doing so, as the character strings are arranged at the top of each line are different from each other, the generation of character strings which are cut off from the background image and unreadable may further be suppressed. As a result, a plurality of character strings may be more reliably read.

In the image processing method of the present invention, in the step (c), as the predetermined direction, the character string may be arranged in the predetermined direction which is set on the basis of an angle inputted by a user.

In the image processing method of the present invention, in the step (b), a position of the arrangement start line may be set at least on the basis of a character string arrangement angle inputted by a user. At this time, when a form is employed wherein the arrangement area is set in a rectangular area based on the size of a main image, for example, if the character string has a downward arrangement angle from left to right, the position of the arrangement start line may be set at a top edge and a left edge of the rectangular area, and if the character string has an upward arrangement angle from left to right, the position of the arrangement start line may be set at a left edge and a bottom edge of the rectangular area. By doing so, as the start position of the character string is put within the rectangular area, reading of the arranged character string may easily be started.

In the image processing method of the present invention, in the step (a), the arrangement area may be set on the basis of information inputted by a user.

A recording media storing a program of the present invention records a program for causing one or more computers to execute each of the steps of the image processing method mentioned above. The program may be stored in a computer-readable recording media (for example, hard disk, ROM, FD, CD, DVD, etc.). Also the program may be distributed from one computer to another computer via a transmission medium (communication network such as the Internet, LAN, etc.), and any other form may be used for transmitting/receiving the program. When a computer is caused to execute the program or a plurality of computers are caused to share and execute each of the steps, each of the steps of the image processing method mentioned above is executed, so that the same operational effect as the image processing method may be obtained.

The image processing apparatus of the present invention is an image processing apparatus for generating a background image where a plurality of character strings are arranged over a plurality of lines, the image processing apparatus comprising:

arrangement area setting means for setting an arrangement area where the character string is arranged;

line setting means for setting an arrangement start line of the character string at least within the arrangement area;

character string arrangement means for arranging the plurality of character strings from a start position of the arrangement start line to a predetermined direction in a predetermined order to make a line, and when a character string to be arranged next is outside of the arrangement area, arranging the character string from a start position of the arrangement start line of next line; and image generating means for generating the background image in an area including the arrangement start line by using a plurality of character strings arranged within the arrangement area.

This image processing apparatus sets an arrangement area where a plurality of character strings are arranged, sets an arrangement start line of a character string at least within the arrangement area, arranges a plurality of character strings from a start position of the arrangement start line to a predetermined direction in a predetermined order, and when a character string to be arranged next is outside of the arrangement area, arranges the character string from a start position of the arrangement start line of next line, and generates a background image in an area including the arrangement start line by using a plurality of character strings arranged within the arrangement area. As described above, since a plurality of character strings are arranged from the arrangement start line at least set in the arrangement area to a predetermined direction, the arranged character strings are more difficult to be cut, and a plurality of character strings are aligned to be a line, the character strings are easy to read as a single string. Therefore, in a background image where a plurality of character strings are arranged, it is possible to further increase readability of the character strings in the background image. In addition, it is also possible to execute various steps of the image processing method mentioned above in this image processing apparatus.

20 User PC, 21 Controller, 22 CPU, 23 ROM, 24 RAM, 25 HDD, 26 USB controller, 26a USB port, 27 Input device, 28 Display, 29 Bus, 30 Printer, 31 Controller, 32 CPU, 33 ROM, 34 RAM, 35 Printing mechanism, 36 USB controller, 36a USB port, 38 Operation panel, 38a Display section, 38b Operation section, 50 Stamp mark setting screen, 51 Ground tint image display section, 52 Mark name display section, 53 Text display section, 54 Text detail setting button, 55 Type display section, 56 Position input section, 56a Repeat detail setting button, 57 Font input section, 58 Style input section, 59 Color information input section, 60 Arrangement input section, 61 Decision button, 62 Cancel button, 63 Help button, 64 Initial setting read button, 70 Text detail setting screen, 72 Mark name display section, 73 Text display section, 74 Setting text display section, 76 Addable text display section, 80 Repeat detail setting screen, 82 Repeat pattern input section, 84, Cut-down rate input section, 86 Top character change input section.

DESCRIPTION OF THE PREFERRED EMBODIMENT

Figure 1:
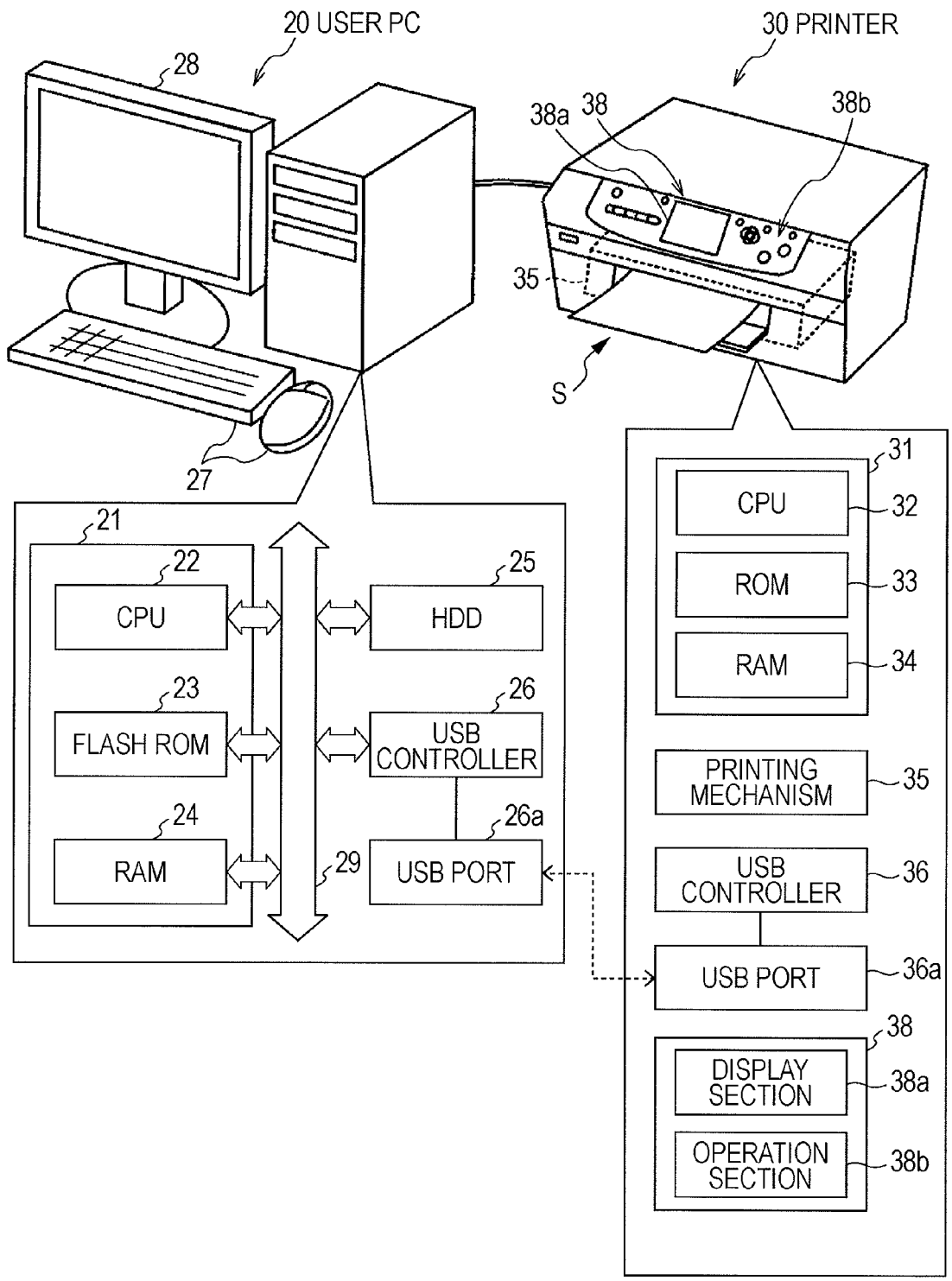
FIG. 1 is a configuration view showing a schematic configuration of a user PC 20 and a printer 30.

A preferred embodiment of the present invention will be described with reference to the accompanying drawings. FIG. 1 is a configuration view showing a schematic configuration of a user personal computer (PC) 20 as an image processing apparatus of an embodiment of the present invention and a printer 30 as a printing device. The user PC 20 is a known general-purpose personal computer and comprises a controller 21 including a CPU 22 for executing various controls, a flash ROM 23 for storing various control programs and a RAM 24 for temporarily storing data, a HDD 25 which is a large capacity memory for storing various application programs and various data files, and a USB controller 26 for transmitting/receiving data between external devices connected to a USB port 26a. In the HDD 25, a printer driver used when transmitting a print job to a printer 30 to perform a print processing, and the like are stored. The user PC 20 comprises an input device 27 such as a keyboard and a mouse from which a user inputs various instructions, a display 28 for displaying various information on a screen, and so on, and has a function for performing an operation corresponding to an input operation when the user performs the input operation at a cursor, etc. displayed on the display 28 via the input device 27. The controller 21, the HDD 25, the USB controller 26, the input device 27, and the display 28 are electrically connected by a bus 29, and constituted to be able to transmit/receive various control signals and data. The user PC 20 instructs the printer 30 to perform printing processing, and displays information regarding the printer 30, using installed programs.

The printer 30 comprises a controller 31 which includes a ROM 33 storing various programs and a RAM 34 for temporarily storing data and performs entire device control as a microprocessor centered on a CPU 32, a printing mechanism 35 for printing an image on a recording paper S, a USB controller 36 which can input/output information between external devices connected to a USB port 36a, and an operation panel 38 including a display section 38a which can display information to the user, an operation section 38b which can input an instruction from the user, etc. The controller 31, the printing mechanism 35, the USB controller 36, and the operation panel 38 are electrically connected by a bus not shown in the drawings. Although the printing mechanism 35 is not shown in the drawings, the printing mechanism 35 is a mechanism using an ink jet method in which each color of ink is pressurized and the pressurized ink is discharged to the recording paper S so that a printing processing is performed. A mechanism for pressurizing the ink can be a modification of a piezoelectric element or a device generating bubbles using heat generated by a heater.

Figure 2:
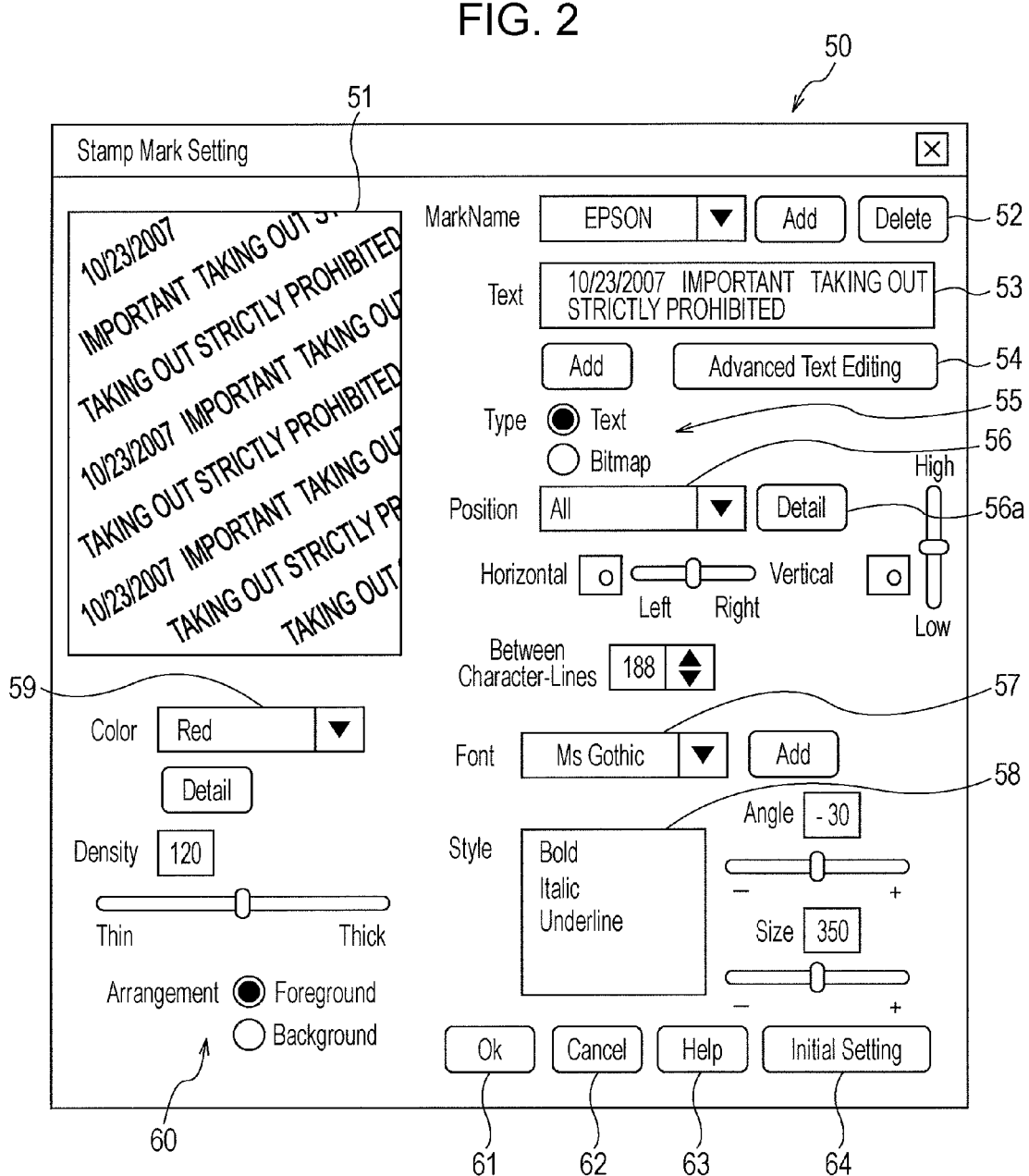
FIG. 2 is an illustration of a stamp mark setting screen 50.
Figure 3:
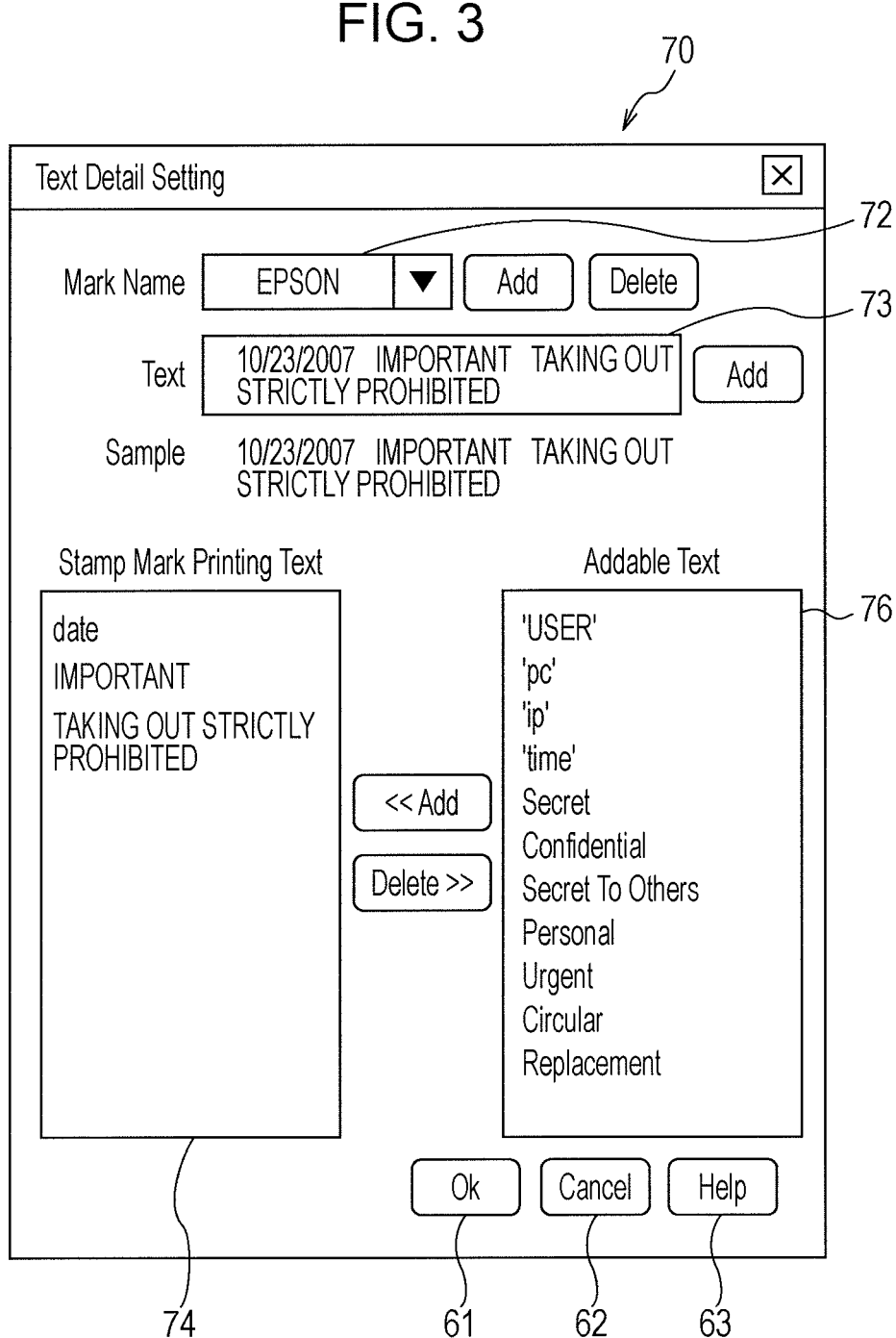
FIG. 3 is an illustration of a text detail setting screen 70.
Figure 4:
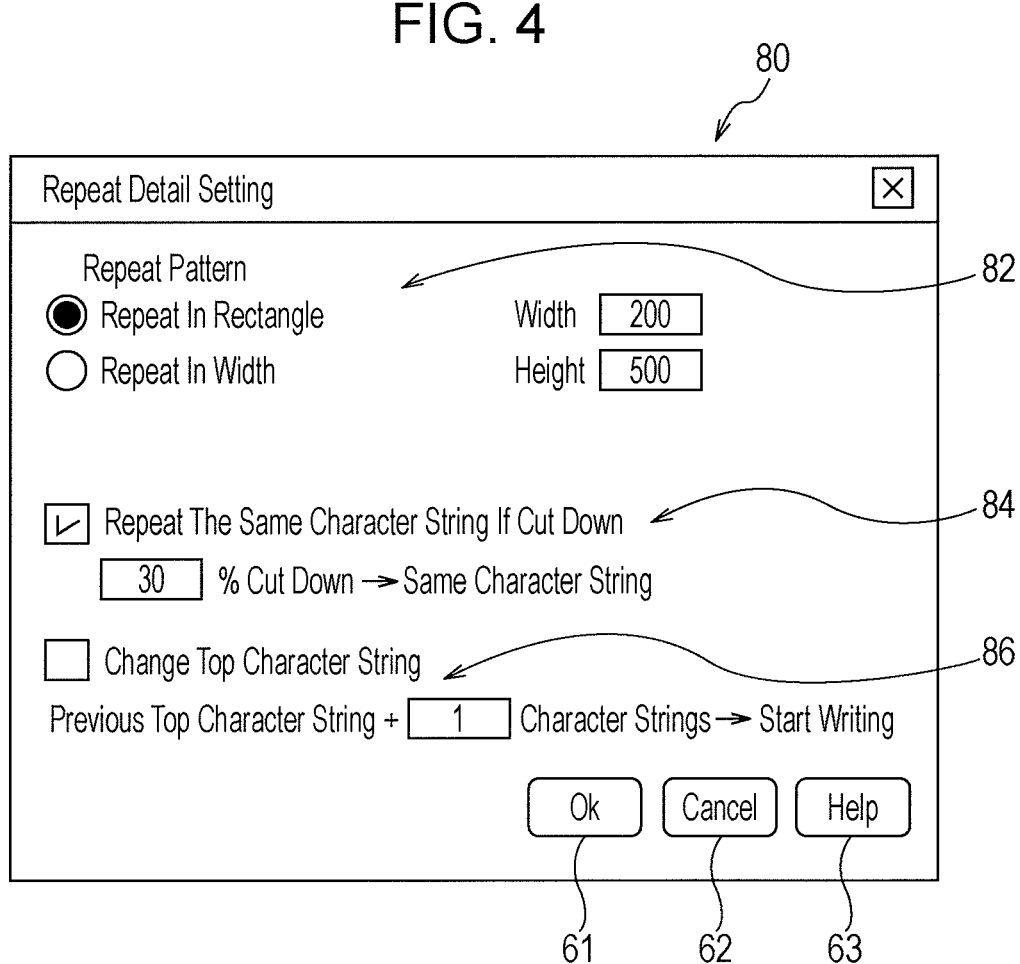
FIG. 4 is an illustration of a repeat detail setting screen 80.

Next, an operation of the user PC 20 of this embodiment which is configured in this way, especially an operation for generating a background image which is a watermarked image being overlap-printed on the main image, specifically a ground tint image (stamp mark) in which a plurality of types of character strings are arranged over a plurality of lines, will be described. FIG. 2 is an illustration of a stamp mark setting screen 50, FIG. 3 is an illustration of a text detail setting screen 70, and FIG. 4 is an illustration of a repeat detail setting screen 80. First the user selects a printing operation for printing an image while executing an application program, etc. Then, the CPU 22 of the user PC 20 reads the printer driver from the HDD 25, and displays a print setting screen (not shown in the drawings) on the display 28. The user clicks a stamp mark setting button (not shown in the drawings) arranged on this print setting screen. Then, the CPU 22 reads a stamp mark setting screen shown in FIG. 2 from the HDD 25, and displays the stamp mark setting screen on the display 28.

In this stamp mark setting screen 50, a ground tint image display section 51 which is arranged in an upper left portion and displays a preview image of a ground tint image which will be overlapped with the main image, a mark name display section 52 which is arranged in an upper right portion and in which a ground tint image registered in advance can be selected from a pull down menu, a text display section 53 which is arranged in an upper right portion and displays a text (character string) of a ground tint image which is currently inputted, a text detail setting button 54 which is arranged in the text display section 53 and is clicked when performing the text detail setting, a type display section 55 for specifying whether an image is a text or a bitmap, a position input section 56 which is arranged in a middle portion and from which a position, angle, etc. of the character string of the background image are inputted, a repeat detail setting button 56a which is clicked when setting a detail of a character string repetition, a font input section 57 which is arranged in a lower right portion and from which a font of the character string is inputted, a style input section 58 which is arranged in a lower right portion and from which an angle, size, etc. of the character string is inputted, a color information input section 59 which is arranged in a middle right portion and from which information such as a color, transmission rate, etc. of the ground tint image is inputted, and an arrangement input section 60 which is arranged in the lowest portion and from which an arrangement position specifying a foreground or a background of the ground tint image are arranged. In addition, in the lowest right portion of the stamp mark setting screen 50, a Decision button 61 which is clicked when choosing inputted content, a Cancel button 62 which is clicked when cancelling the inputted content, a Help button 63 which is clicked when reading a help screen, and an Initial setting read button 64 which is clicked when resetting to an initial setting are arranged. When the user arbitrarily performs input in these input sections of the stamp mark setting screen 50, the CPU 22 stores the inputted content in a predetermined area in the HDD 25.

When the text detail setting button 54 arranged in the stamp mark setting screen 50 is clicked by the user, the CPU 22 reads the text detail setting screen 70 (refer to FIG. 3) stored in a predetermined area in the HDD 25 and displays the text detail setting screen 70 on the display 28. In this text detail setting screen 70, a mark name display section 72 in which a ground tint image registered in advance can be selected from a pull down menu, a text display section 73 which displays a text (character string) of a ground tint image which is currently inputted, a setting text display section 74 which displays a character string currently set in the ground tint image, and an addable text display section 76 which displays texts addable to the ground tint image, are included. In addition, also in the lowest portion of the text detail setting screen 70, the Decision button 61, the Cancel button 62, and the Help button 63 are arranged. When the user selects a text displayed in the setting text display section 74 or the addable text display section, and clicks an Add button or a Delete button, the CPU 22 adds or deletes the text corresponding to the above operation, and reflects the operation result in the content of the text display section 73.

When the repeat detail setting button 56*a* arranged in the stamp mark setting screen 50 (refer to FIG. 2) is clicked by the user, the CPU 22 reads the repeat detail setting screen 80 (refer to FIG. 4) stored in a predetermined area in the HDD 25 and displays the repeat detail setting screen 70 on the display 28. In this repeat detail setting screen 80, a repeat pattern input section 82 for which a standard used for arranging character strings is inputted, a cut-down rate input section 84 for which a character string repetition is set by a cut-down rate of a character, and a top character change input section 86 for which a change of a top character string can be inputted, are arranged. In the repeat pattern input section 82, "repeat in rectangle" in which a character string is arranged in an arrangement area determined based on a size of the main image on which a ground tint image is overlapped, or "repeat in width" in which a character string is arranged using an inputted value as an arrangement width of the character string, can be inputted. This arrangement area is set to an area a little smaller than the size of a piece of paper on which the main image is printed. The arrangement width can be set regardless of the size of the main image on which the background image is overlapped and the size of the paper on which the main image is printed, and can be set by inputting a value in an input box. In the cut-down rate input section 84, an input section in which "Repeat the same character string if cut down" is set by a checkbox and a cut-down rate is inputted, is provided. In the top character change input section 86, input boxes in which "Change top character string" is set by a checkbox and a character string to be changed can be inputted are provided. It is set that only either one of the checkbox of the cut-down rate input section 84 and the checkbox of the top character change input section 86 can be checked. When the user performs input in these checkboxes and input boxes, the CPU 22 performs a processing for storing the set contents corresponding to the user operation in a predetermined area in the HDD 25.

Figure 5:
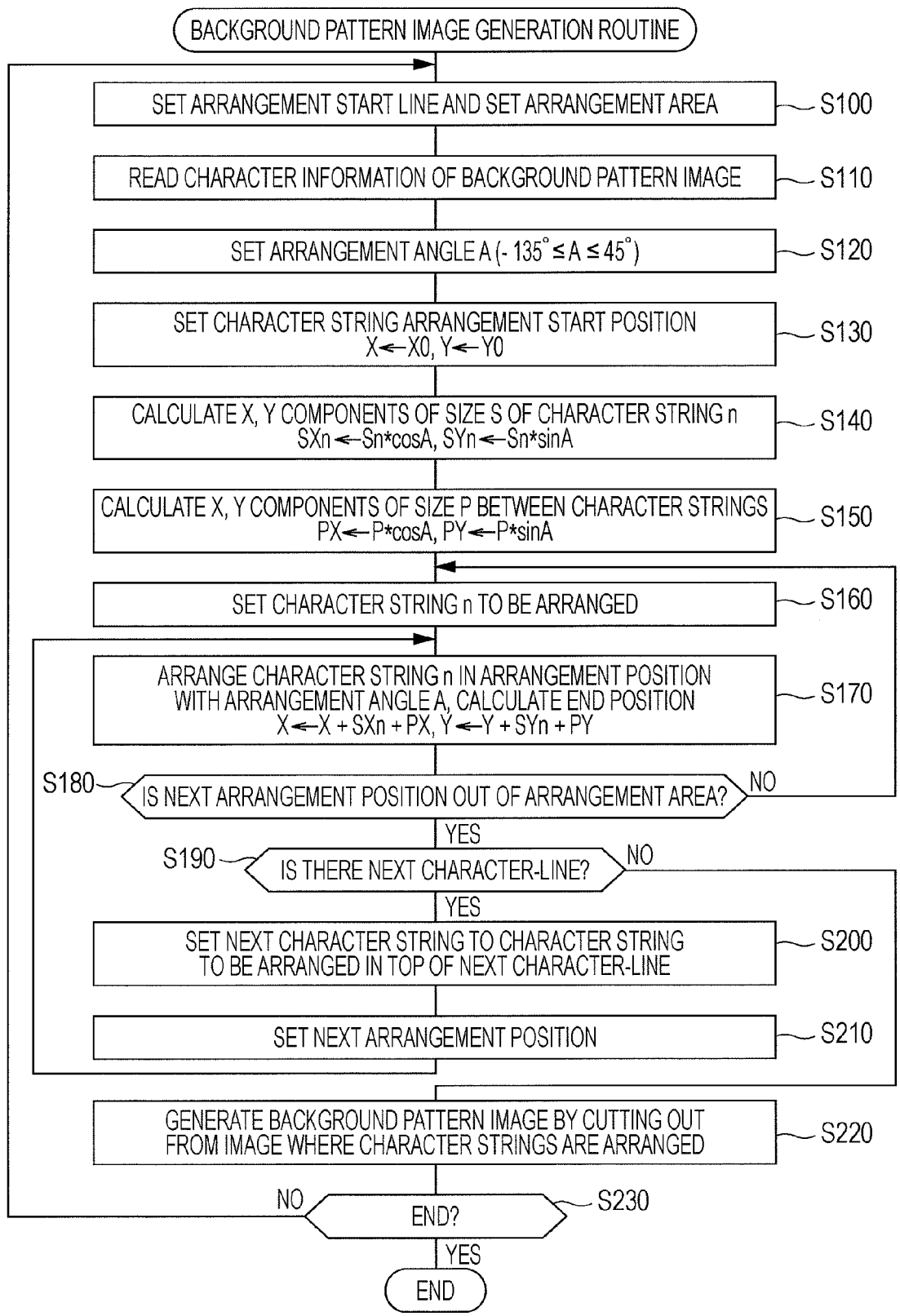
FIG. 5 is a flowchart showing an example of a ground tint image generation routine.

Next, a ground tint image generation processing will be described. Here, a case in which a plurality of types (here, there are three types) of character strings are arranged in a direction rising from left to right, the "repeat in rectangle" is set in the repeat pattern input section 82, the checkbox of the cut-down rate input section 84 is not checked, and a character string which is outside of the arrangement area is arranged at the top of next line (refer to FIG. 6 mentioned below) will be mainly described. FIG. 5 is a flowchart showing an example of a ground tint image generation routine. This routine is stored in the HDD 25, and executed by the CPU 22 after the stamp mark setting screen is displayed.

Figure 6:
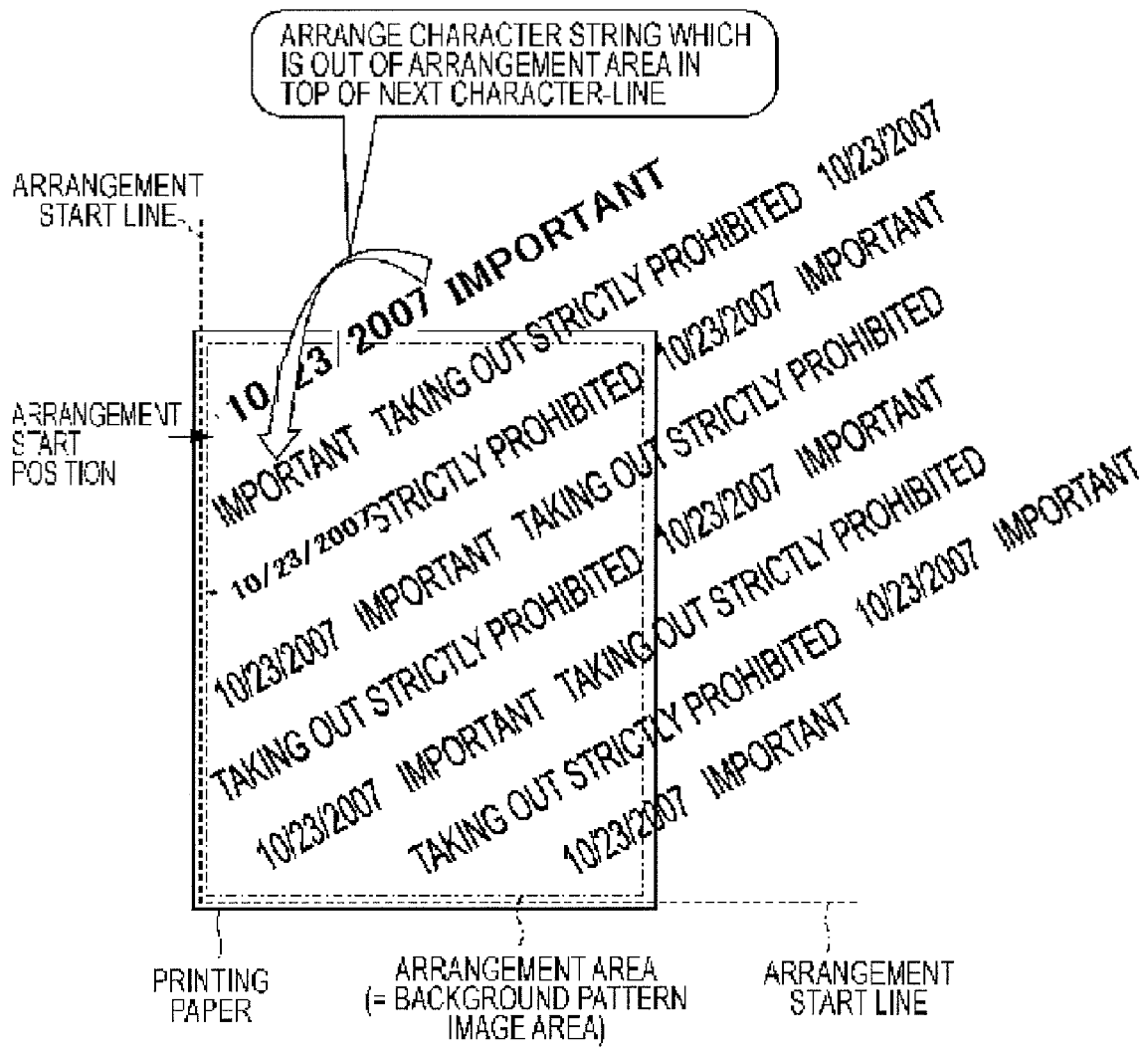
FIG. 6 is an illustration of an example of arranging a plurality of types of character strings by repeating in a rectangular shape.

When this routine is executed, first the CPU 22 executes setting of the arrangement start line and setting of the arrangement area (step S100). When the "repeat in rectangle" is set in the repeat pattern input section 82, the setting of the arrangement area is specified to be set in an area inside the paper on which the main image is printed with a predetermined margin included. FIG. 6 is an illustration of an example of arranging a plurality of types of character strings in a rectangular shape by repeating the character strings. At this time, the ground tint image is set to be approximately the same size as that of the arrangement area. On the other hand, when the "repeat in width" is set in the repeat pattern input section 82, the setting of the arrangement area is specified to be set in an area starting from the left edge of the main image (printing paper) and having the width inputted in the repeat pattern input section 82 (refer to FIG. 7 mentioned below). In addition, the arrangement start line is at least set in the arrangement area, on the basis of the angle of the character string inputted in the style input section 58 and the repeat pattern inputted in the repeat pattern input section 82. For example, when the "repeat in rectangle" is set in the repeat pattern input section 82 and the character string is set to an angle rising from left to right, the arrangement start lines are specified to be sides of the bottom edge and the left edge of the arrangement area (refer to FIG. 6), and when the character string is set to an angle falling from left to right, the arrangement start lines are specified to be sides of the top edge and the left edge of the arrangement area (refer to FIG. 14 mentioned below). When the "repeat in width" is set in the repeat pattern input section 82, the arrangement start line is specified to be an extended line of the left edge of the arrangement area regardless of the angle of the character string (refer to FIG. 7 mentioned below). Each input value inputted last time in the stamp mark setting screen 50, the text detail setting screen 70, and the repeat detail setting screen 80 is stored in the HDD 25, and when a new value is inputted in each screen by the user as mentioned above, the value is updated to the new value.

Next, the CPU 22 reads character information of the ground tint image (step S110). Here, the CPU 22 reads the character strings set in the display section 74, the font inputted in the font input section 57, the angle and the size inputted in the style input section 58, etc. Next, the CPU 22 sets an arrangement angle A of the character string based on the angle inputted in the style input section 58 (step S120). This processing is a processing for properly resetting an inputted angle to an angle in which the character string can be properly arranged when an angle in which the character string cannot properly aligned (for example 90°) or an angle in which the character string is arranged upside down (for example 180°) is inputted for example. Here, for example, it is specified that when the inputted angle is 45° to 180°, an angle of −135° to 0° is set to the arrangement angle A, and when the inputted angle is −180° to −135°, an angle of 0° to 45° is set to the arrangement angle A. This arrangement angle A can be reset to an angle other than the above angle range or it is possible to limit an angle range which can be inputted and omit this processing. When the angle is 45° to 180° or −180° to −135°, it is possible to convert the angle to be upside down and finally make the image upside down, so that the character string is properly arranged.

Next, the CPU 22 sets the arrangement start position of the character string (step S130). Here, for example, at the left edge of the main image (printing paper), a position (X0, Y0) which is located at a predetermined distance lower than the top edge and on the arrangement start line is set to the arrangement start position (refer to FIG. 6). Next, the CPU 22 calculates an X component (SXn) and a Y component (SYn) of a size Sn of the character string n by the formulas (1) and (2) below using the arrangement angle A (step S140). Here, the CPU 22 calculates the X component (SXn) and the Y component (SYn) for all of the plurality kinds of character strings set in the text display section 53. Here, "n" represents a number corresponding to the plurality kinds of character strings. Next, the CPU 22 calculates an X component (PX) and a Y component (PY) of a size P of a space between the character strings by the formulas (3) and (4) below using the arrangement angle A (step S150). When arranging a character string to be slanted, if the X components and Y components of the character string and the space between character strings are obtained in this way, each component value only has to be added to coordinates of the start point when arranging the character string and the space between character strings, so that an position management of the character string becomes easy. Here, the position management of the character string is performed by using a length of the character string. In addition, regarding the formulas (1) to (4), a sign conversion, etc. are appropriately performed based on the start position and angle conversion so that the character string is not arranged upside down but is arranged properly.

$$SXn = Sn \times \cos(A) \qquad \text{Formula (1)}$$

$$SYn = Sn \times \sin(A) \qquad \text{Formula (2)}$$

$$PX = P \times \cos(A) \qquad \text{Formula (3)}$$

$$PY = P \times \sin(A) \qquad \text{Formula (4)}$$

Next, the CPU 22 sets the character string n to be arranged this time (step S160), arranges the set character string n to the arrangement position, adds the X component and the Y component of the size S of the character string n, and obtains coordinates of an end point of the arranged character string n (step S170). In the setting of the character strings this time, the first character string of the character strings inputted in the text display section 53 is set as an initial value. The character string n is arranged from the arrangement position in a direction of the arrangement angle A. Next, the CPU 22 determines whether the character string to be arranged next is outside of the arrangement area or not, based on coordinates of the arrangement position of the next character string, the coordinates being calculated by adding a space between the character strings to the end coordinates (step S180). When a part of current character string protrudes from the arrangement area, of course, it is possible to determine that the next character string is arranged outside of the arrangement area. When the character string to be arranged is not outside of the arrangement area, the CPU 22 sets the character string n to be arranged at step S160, and arranges the character string and obtains the coordinates of the end point at step S170. When arranging the character string for the second time or later, the character string is set in order of the displayed character strings which are displayed in the text display section 53, the space between character strings is arranged continuously next to the previously arranged character string, and the character string is arranged continuously next to the space so that a "line" is formed. When calculating the coordinates of the end point, each coordinate of the space between character strings is added.

On the other hand, when the character string arranged next is outside of the arrangement area at step S180, the CPU 22 determines whether there is a next line or not (step S190), and when there is a next line, the CPU 22 sets a character string next to the arranged character string to a character string to be arranged at the top of the next line (step S200), sets an arrangement position of the next line (step S210), and repeats the processing of step S170 and the following steps. The arrangement position of the next line is set by a calculation in which a length between lines inputted in the position input section 56 is added to a Y-coordinate of the start position of the previous line.

Here, a processing from step S160 to S210 will be specifically described using FIG. 6. In an example of FIG. 6, first a character string "2007/10/23" which is the top character string in the text display section 53 is set to a character string to be arranged in the arrangement start position (step S160), and this character string is arranged in the arrangement start position so that an arrangement angle becomes the arrangement angle A (step 170). Next, since the current character string protrudes from the arrangement area, the CPU 22 determines that a character string to be arranged next is outside of the arrangement area at step S180. And since there is a next line at step S190, the CPU 22 sets a character string "IMPORTANT" which is the next character string in the text display section 53 to a character string to be arranged at the top of the next line (step S200), and arranges this character string in the arrangement position of the top of the next line (step S170). Since a character string next to this character string is not outside of the arrangement area, as a character string to be arranged next, "TAKING OUT STRICTLY PROHIBITED" is set (step S160), the space between character strings is arranged, and this character string is arranged continuously next to the space to form a line (step S170). Through the same processes, the character string "2007/10/23" which is outside of the arrangement area is arranged at the top of the next line, these processes are repeated, and the arrangement image shown in FIG. 6 can be generated.

On the other hand, when it is determined that there is not a next line at step S190, the CPT 22 recognizes that the arrangement of the character strings is completed, cuts out an area of the ground tint image in a range including the arrangement start line from the image in which the character strings are arranged to generate the ground tint image (step S220), and determines whether the processing is completed or not based on an input of the user (step S230). When determined that the processing is not completed, the CPU 22 repeats the processes of step 100 and the following steps, and when determined that the processing is completed, the CPU 22 ends this routine. Here, for example, the processing is determined to be completed when the decision button 61 is clicked on the stamp mark setting screen 50, and thereafter a print processing is performed, or when the stamp mark setting screen 50 is closed to cancel the processing. The generated ground tint image is copied and changed in size to be displayed in the ground tint image display section 51, or used for being overlapped on the main image and printing out from the printer 30 after the user inputs a print instruction.

Figure 7:
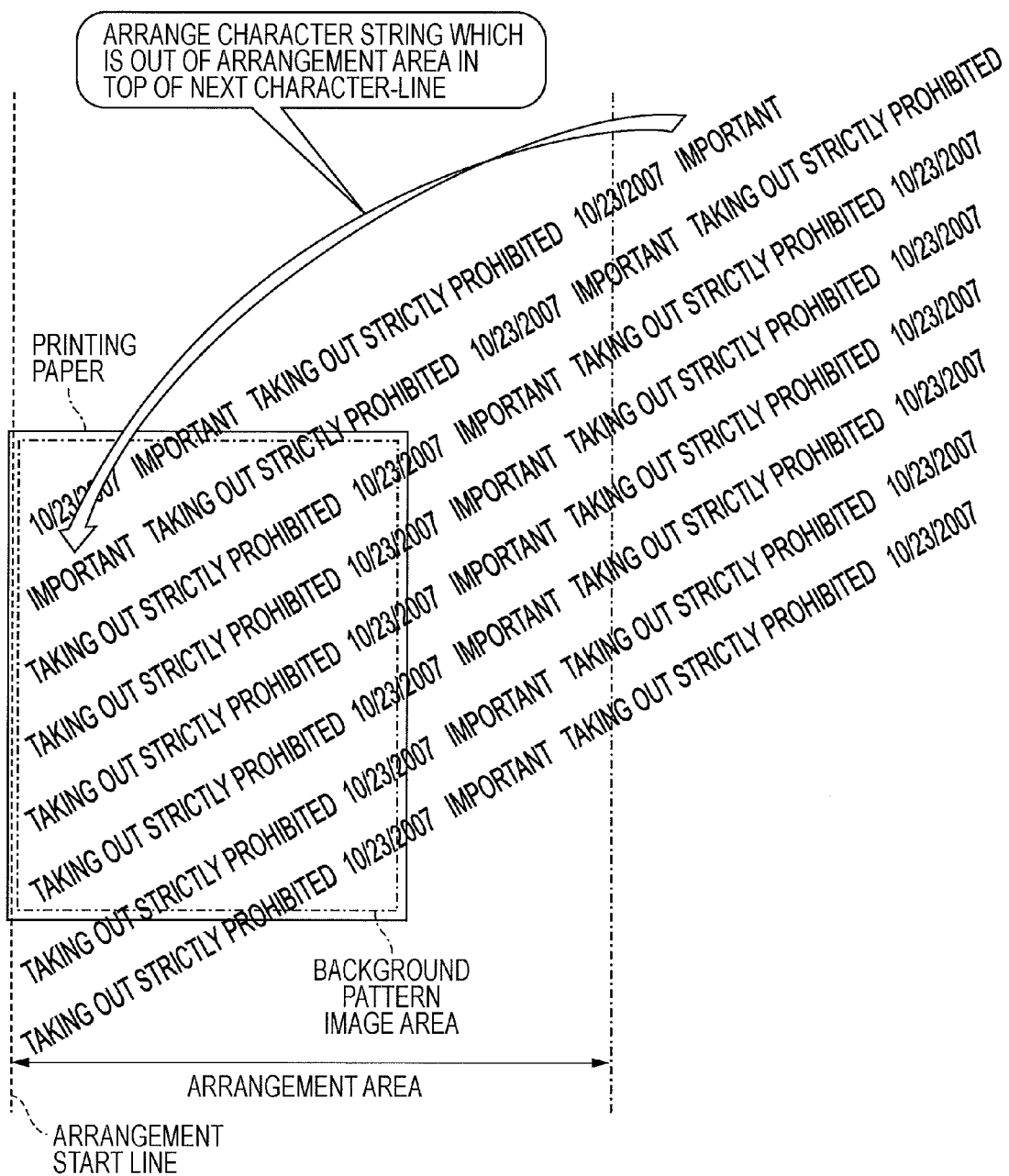
FIG. 7 is an illustration of an example of arranging a plurality of types of character strings by repeating in a width.

Next, a ground tint image generation processing in which the "repeat in width" is set in the repeat pattern input section 82 will be described. FIG. 7 is an illustration of an example of arranging a plurality of types of character strings by repeating in a width. In this case, the same processing as the above mentioned ground tint image generation routine is performed except for step S100 in which the arrangement area is set in an area starting from the arrangement start line set at the left edge side of the main image (printing paper) and having the width inputted in the repeat pattern input section 82, and step S180 which determines whether a next character string is outside of the arrangement area set by the width or not. Hereafter, the processing will be specifically described with reference to FIG. 7. In an example of FIG. 7, first at step S100, a line that is an upward and downward extended side of the left edge of the arrangement area is set to the arrangement start line, and the arrangement area is set in an area starting from this line and having the width inputted in the repeat pattern input section 82. Next, using the same processing as the processing mentioned above, the character strings, "2007/10/23", "IMPORTANT", and "TAKING OUT STRICTLY PROHIBITED" are arranged in order from the arrangement start position in a direction of the arrangement angle A to form a line (steps S160 to S170). After setting a second "2007/10/23", the process determines that a character string to be arranged next is outside of the arrangement area at step S180. And since there is a next line at step S190, the process sets a character string "IMPORTANT" which is the next character string to a character string to be arranged at the top of the next line (step S200), and arranges this character string in the arrangement position of the top of the next line (step S170). By repeating these processings until the arrangement area is filled with the character strings, the arrangement image shown in FIG. 7 can be obtained. Finally, the ground tint image area indicated by chain double-dashed lines in the figure is cut out to generate the ground tint image. In this way, since when using the "repeat in width", the character strings are arranged without considering the size of the main image, the size of the printing paper, etc. it is relatively easy to change the kinds of the character string which is arranged in the arrangement start position (the left edge of the main image) by changing the value of the width.

Figure 8:
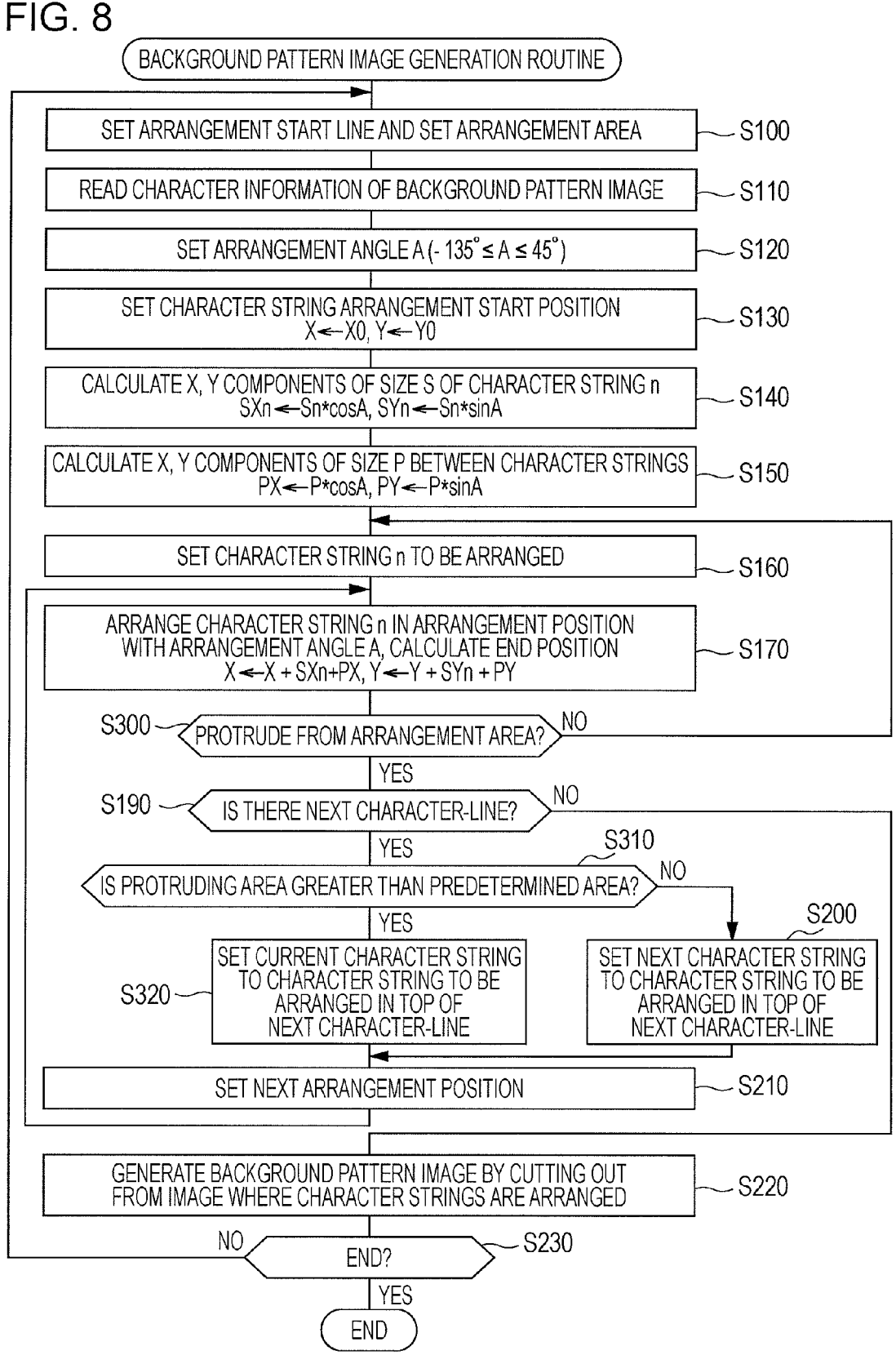
FIG. 8 is a flowchart showing an example of another ground tint image generation routine.

Next, regarding the ground tint image generation processing, a case in which a plurality of types (here, kinds are three) of character strings are arranged in a direction rising from left to right, the "repeat in rectangle" is set in the repeat pattern input section 82, the checkbox of the cut-down rate input section 84 is checked, and a character string which is arranged at the top of next line is set depending on the cut-down rate of the character string will be described. FIG. 8 is a flowchart showing an example of another ground tint image generation routine which is executed when the checkbox in the cut-down rate input section 84 is checked. The same processings as those of the above mentioned ground tint image generation routine are given the same step number and their descriptions are omitted. This routine is the same as the above mentioned ground tint image generation routine except for that the setting method of a character string arranged at the top of the next line is different. In this routine, the CPU 22 arranges a character string at the above mentioned step S170, thereafter determines whether the arranged character string protrudes from the arrangement area or not (step S300) by a relationship between the end position calculated at step S170 and a boundary line of the arrangement area, and when there is a next line at step S190, determines whether the area where the character string protrudes is more than predetermined times a predetermined area or not (step S310). This predetermined value is the value inputted in the input box in the cut-down rate input section 84. Here, a rate of a length of character string which protrudes from the arrangement area is recognized as a rate of the area where the character string protrudes and processed. When the checkbox in the cut-down rate input section 84 is checked and no value is inputted in the input box, if it is determined that the character string protrudes, the determination result is YES at step S310. When the area where the character string protrudes is not more than the predetermined times the predetermined area, the CPU 22 sets next character string to the character string to be arranged at the top of the next line at step S200, and when the area where the character string protrudes is more than the predetermined times the predetermined area, the CPU 22 sets current character string to the character string to be arranged at the top of the next line (step S320), as the currently arranged character string cannot be viewed, and the CPU 22 performs the above mentioned processings of step S210 and the following steps.

Figure 9:
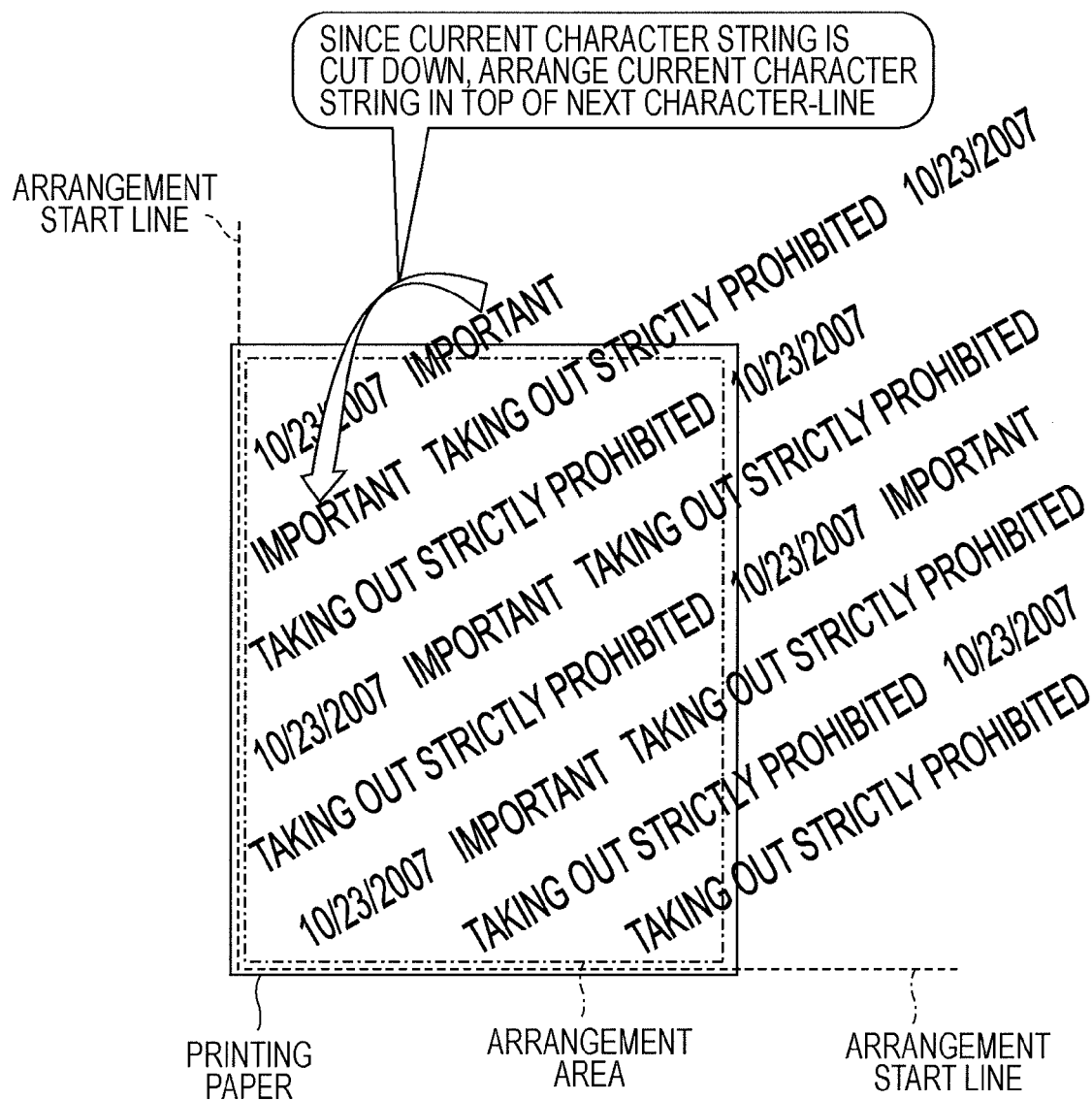
FIG. 9 is an illustration of another example of arranging a plurality of types of character strings by repeating in a rectangular shape.
Figure 10:
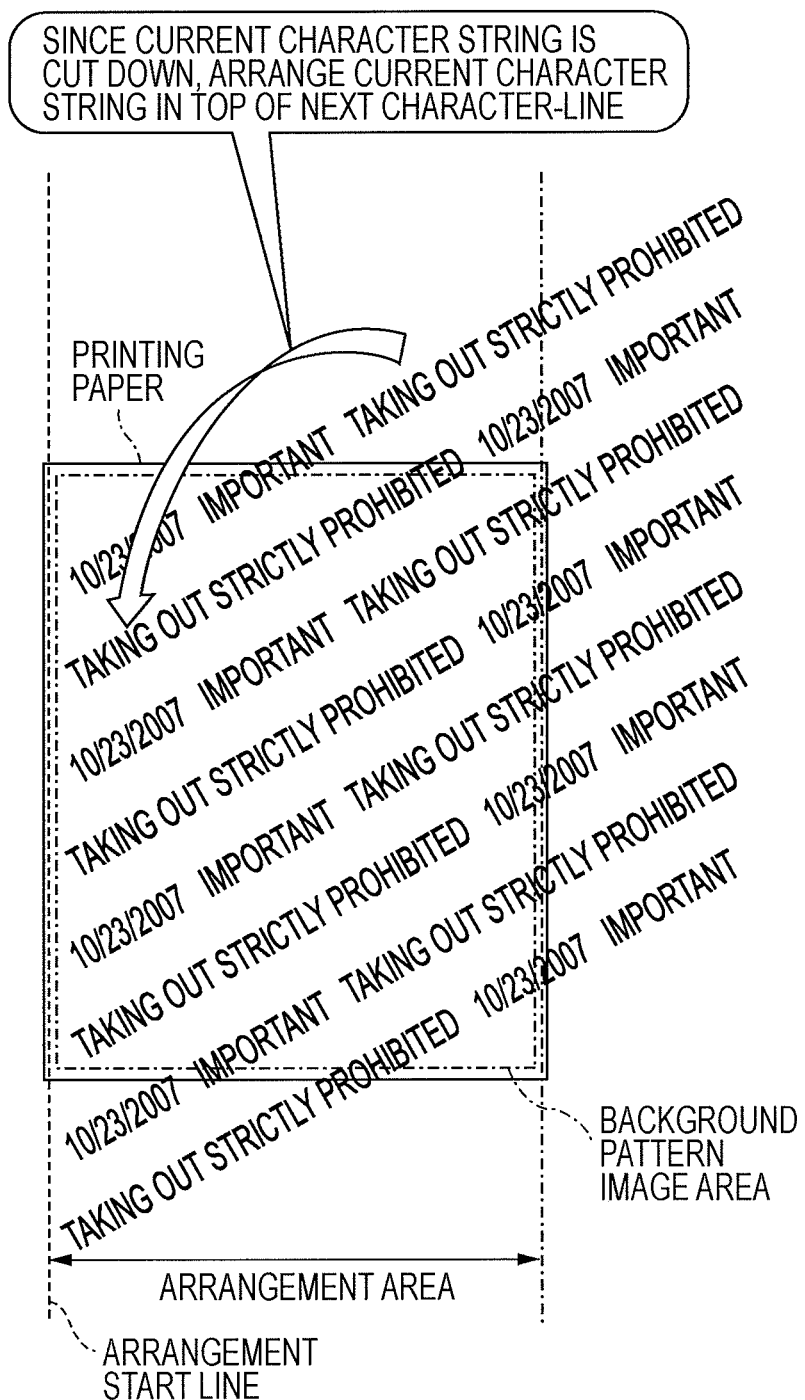
FIG. 10 is an illustration of another example of arranging a plurality of types of character strings by repeating in a width.
Figure 11:
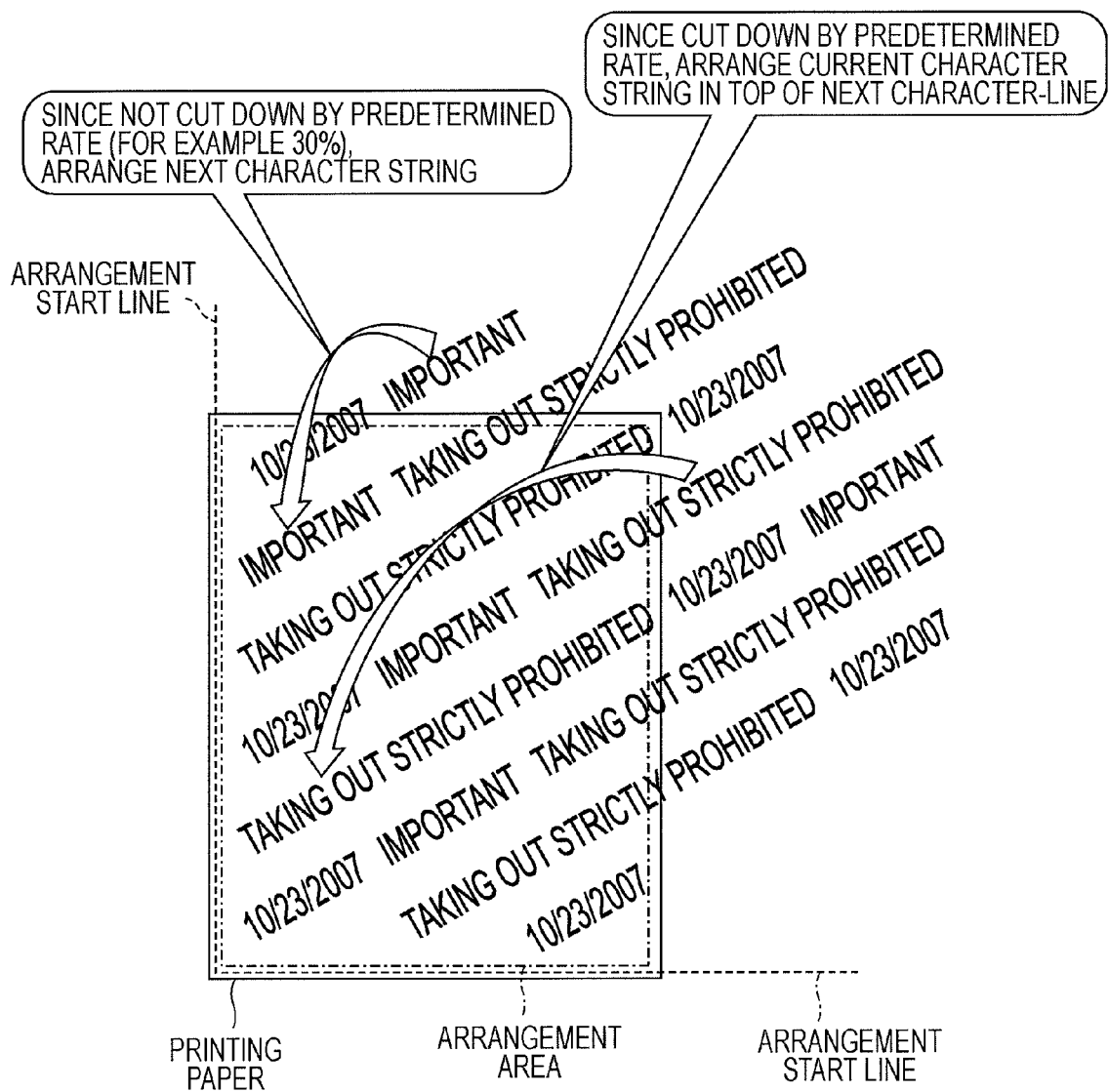
FIG. 11 is an illustration of another example of arranging a plurality of types of character strings by repeating in a rectangular shape.
Figure 12:
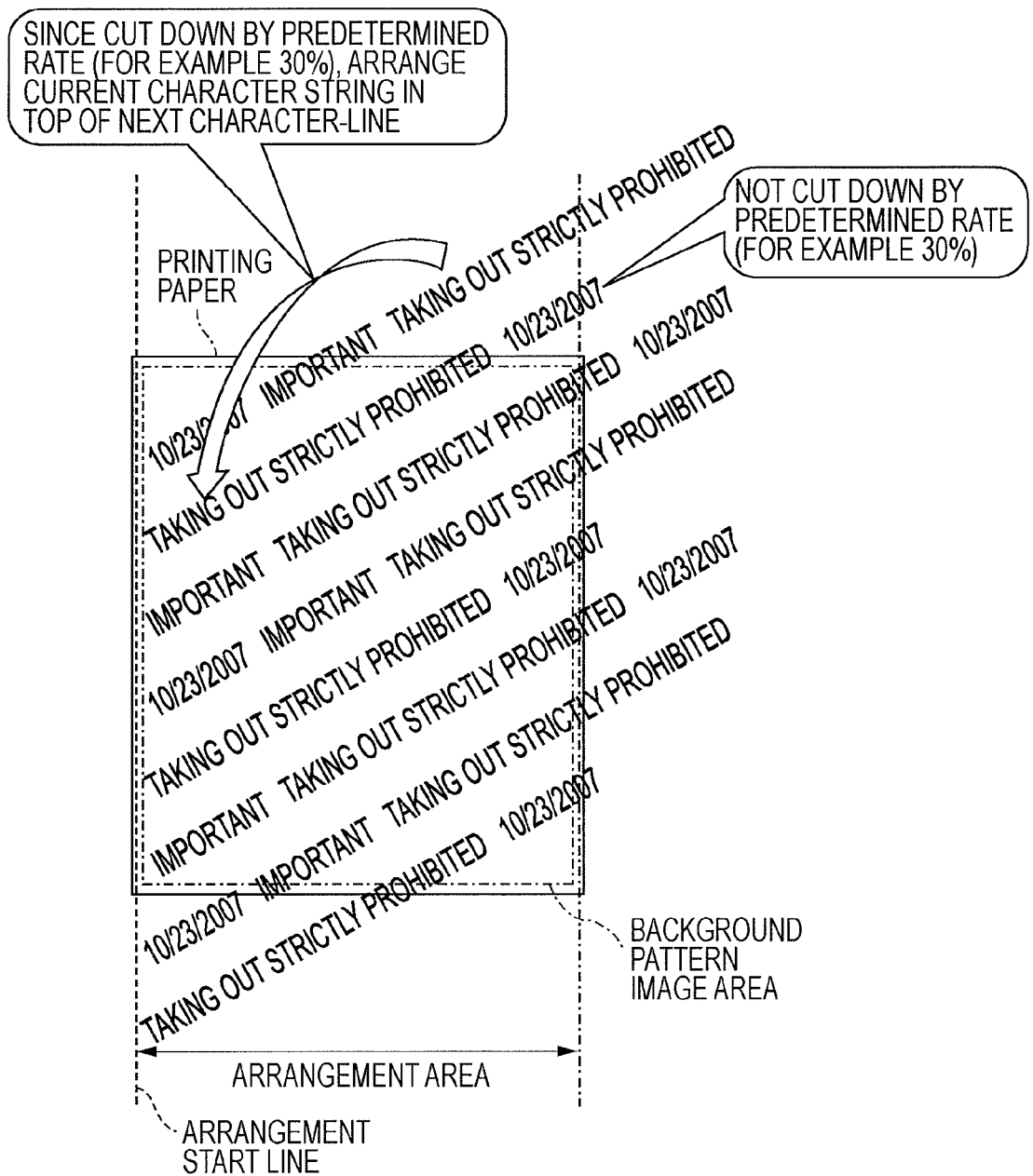
FIG. 12 is an illustration of another example of arranging a plurality of types of character strings by repeating in a width.

FIG. 9 is an illustration of an example of arranging a plurality of types of character strings by repeating in a rectangular shape, in which the arrangement of character string is set depending on whether the character string protrudes or not, FIG. 10 is an illustration of an example of arranging a plurality of types of character strings by repeating in a width, in which the arrangement of character string is set depending on whether the character string protrudes or not, FIG. 11 is an illustration of an example of arranging a plurality of types of character strings by repeating in a rectangular shape, in which the arrangement of character string is set depending on a protrusion rate of the character string, and FIG. 12 is an illustration of an example of arranging a plurality of types of character strings by repeating in a width, in which the arrangement of character string is set depending on the protrusion rate of the character string. For example, when arranging a plurality of types of character strings by repeating in a rectangular shape, and setting the arrangement of the character strings depending on whether the character string protrudes or not, as shown in FIG. 9, if a part or all of the arranged character string protrudes from the arrangement area defined by the rectangular shape, the protruding character string is arranged at the top of the next line. Otherwise, when arranging a plurality of types of character strings by repeating in a width, and setting the arrangement of the character strings depending on whether the character string protrudes or not, as shown in FIG. 10, if a part or all of the arranged character string protrudes from the arrangement area defined by the width, the protruding character string is arranged at the top of the next line. When arranging a plurality of types of character strings by repeating in a rectangular shape, and setting the arrangement of the character string depending on the protrusion rate of the character string, as shown in FIG. 11, if the arranged character string has a protrusion rate greater than a predetermined rate (for example 30% of the whole character string), the protruding character string is arranged at the top of the next line. Otherwise, when arranging a plurality of types of character strings by repeating in a width, and setting the arrangement of the character string depending on the protrusion rate of the character string, as shown in FIG. 12, if the arranged character string has a protrusion rate greater than a predetermined rate (for example 30% of the whole character string), the protruding character string is arranged at the top of the next line. By performing these processings, the arrangement images shown in FIGS. 9 to 12 can be obtained.

Figure 13:
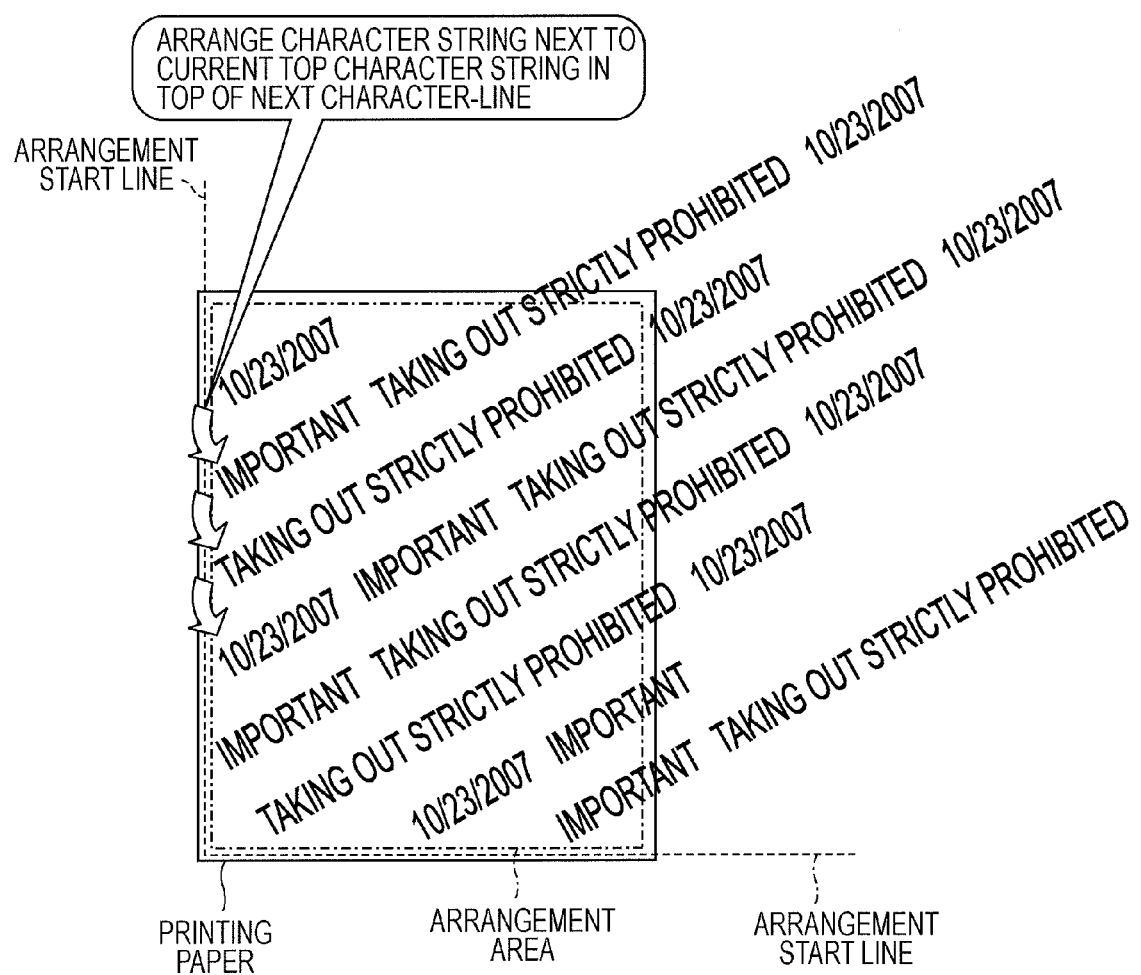
FIG. 13 is an illustration of another example of arranging a plurality of types of character strings by repeating in a rectangular shape.

Next, regarding the ground tint image generation processing, a case in which a plurality of types (here, kinds are three) of character strings are arranged in a direction rising from left to right, the checkbox of the top character change input section 86 is checked, and a character string which is arranged at the top of next line is set depending on the value inputted in the input box of the top character change input section 86 will be described. FIG. 13 is an illustration of an example of arranging a plurality of types of character strings by repeating in a rectangular shape, in which the arrangement of the top character string is set in a predetermined order. In this case, in the ground tint image generation routine shown in FIG. 8, steps S310, S320, S200 are omitted, and after determined to be YES at step S190, the character string inputted in order in the top character change input section 86 is arranged at the top of next line. For example, when "previous top character string+1 character strings->start writing" is inputted in the top character change input section 86, as shown in FIG. 13, a character string next to current character string is arranged at the top of next line. By doing so, since a different character string is arranged at the top of each line in the arrangement start position, a readability of more character strings can be improved.

Here, relationships between configuration elements of this embodiment and configuration elements of the present invention will be clarified. The processing of step S100 in the ground tint image generation routine of this embodiment corresponds to the processings of step (a) and step (b) of the present invention, the processings of step S160 to S210 and S300 to S320 correspond to the processing of step (c), and the processing of step S220 corresponds to the processing of step (d). The controller 21 of this embodiment corresponds to the arrangement area setting means, the line setting means, the character string arrangement means, and the image generating means of the present invention.

According to the ground tint image generation routine executed by the CPU 22 of this embodiment which is described above in detail, since a plurality of character strings are arranged from the arrangement start line at least set at the left edge portion of the arrangement area to a right direction, the arranged character strings are more difficult to be cut, and a plurality of character strings are aligned to be a line, the character strings are easy to read as a single string. Therefore, in a ground tint image where a plurality of types of character strings are arranged, it is possible to further increase readability of the character strings in the ground tint image. In addition, since generally a character string is mostly written from left to right, the character string is easier to read. Furthermore, when the repeat in rectangle is set, the ground tint image is generated having a size based on the main image, so that the ground tint image can be generated relatively efficiently. In addition, when the repeat in width is set, by changing the width range for example, it is easy to change the arrangement so that a plurality of types of character strings are arranged in a same frequency more often. Furthermore, when a character string protrudes from the arrangement area, if a character string next to the protruding character string is arranged at the top of next line, it is easy to read a plurality of character strings because an order of repetition of the plurality of character strings can be maintained. Or, in a case in which when a protruding area is greater than predetermined times a predetermined area, the protruding character string is arranged at the top of next line, and when the protruding area is not greater than the predetermined value, a character string next to the protruding character string is arranged at the top of next line, since a character string which protrudes from the arrangement area, in other words a character string which is cut off from the ground tint image, is arranged in the next line, it is possible to further suppress generation of a character string which is cut off from the ground tint image and cannot be read. As a result, a plurality of character strings can be more reliably read. Or, in a case in which when an arranged character string protrudes from the arrangement area, a character string different from the top character string in current line is arranged at the top of the next line, since each different character string is arranged at the top of each line, it is possible to further suppress generation of a character string which is cut off from the ground tint image and cannot be read. As a result, a plurality of character strings can be more reliably read. And furthermore, since when the repeat in rectangle is set and the character strings have an arrangement angle which is rising from left to right, the arrangement start lines are set at the left edge and the bottom edge of the arrangement area, the start position of the character string is within the rectangular area, so that it is easy to start reading of the arranged character string. As mentioned above, by using the user PC 20 of the present invention, it is possible to provide a ground tint image having high flexibility and various layouts.

It is obvious that the present invention is not limited to the above mentioned embodiment, and may be implemented in various embodiments as long as within the technical scope of the present invention.

For example, in the above mentioned embodiment, although the arrangement area is set within a rectangular area based on a size of the main image and within a predetermined width, it is also possible to employ either one of the above areas. In addition, although a character string which is arranged at the top of each line is set depending on whether a character string protrudes from the arrangement area or not, a rate of an area which a character string protrudes from the arrangement area, a specified order, etc. it is also possible to employ one or more of the above conditions.

Figure 14:
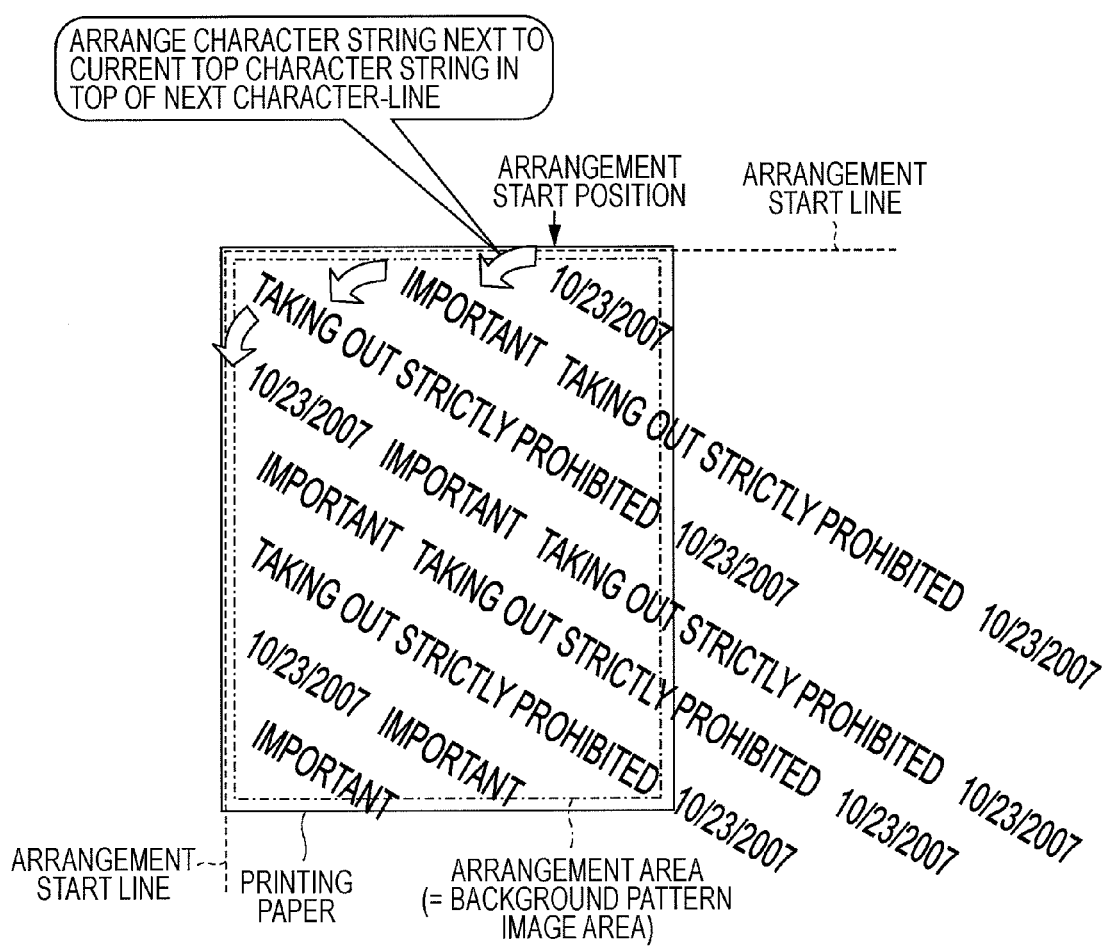
FIG. 14 is an illustration of an example of arranging a plurality of types of character strings with the character strings falling from left to right.

In addition, in the above mentioned embodiment, although it is described that character strings are arranged in a direction rising from left to right, character strings can also be arranged in a direction falling from left to right. FIG. 14 shows an example of arrangement image when the repeat in rectangle is set and the top character change input section 86 is checked. In this case, the arrangement start lines are set near sides of the top edge and the left edge of the arrangement area, and the arrangement start position is set at a position moved a predetermined length leftward from the right top edge of the ground tint image. In this way too, in a ground tint image where a plurality of types of character strings are arranged, it is possible to further increase readability of the character strings in the ground tint image. In addition, since when the character strings have an arrangement angle which is falling from left to right, positions of the arrangement start lines are set at the left edge and the bottom edge of the arrangement area, the start position of the character string is within the rectangular area, so that it is easy to start reading of the arranged character string.

In the above mentioned embodiment, although the generation of the ground tint image in which a plurality of types of character strings are arranged is described, it is also possible to generate a ground tint image in which a single kind of character strings are arranged over a plurality of lines. In this way too, in a ground tint image in which a plurality of character strings are arranged, it is possible to further increase readability of the character strings in the ground tint image.

In the above mentioned embodiment, although the arrangement area in which character strings are arranged is set based on the size of printing paper of the main image on which the ground tint image is overlapped, the arrangement area is not particularly limited to this, and for example, the arrangement area can be set considering the size of the ground tint image, or the arrangement can be set based on the size of the main image itself.

In the above mentioned embodiment, although the position management of a character string is based on the lengths of the X component and the Y component of the character string, the position management is not particularly limited to this, and any method can be employed. In addition, although an area where a character string protrudes is based on the character string length which protrudes from the arrangement area, the area is not particularly limited to this, and the area can also be based on an area which is calculated from the character string area.

In the above mentioned embodiment, although the ground tint image is created by, for example setting the "repeat in rectangle" or "repeat in width" based on the values inputted by the user using the stamp mark setting screen 50 and repeat detail setting screen 80, it is also possible to create the ground tint image which repeats in a rectangle or the ground tint image which repeats in a width based on predetermined fixed values set in advance by omitting input of input values by the user. Specifically, for example, a setting file in which setting values such as the repeat pattern and its accompanying setting values (refer to FIG. 4), the arrangement angle, the character size, the character density (refer to FIG. 2), etc. are stored as the fixed values is stored in the HDD 25 when installing the ground tint image generation program. Next, when the user inputs a text in the text detail setting screen 70 and presses the decision button 61, it may be possible that the controller 21 automatically creates the ground tint image using each setting value stored in the setting file. Since the same ground tint image as the above mentioned embodiment can be created in this way too, in a ground tint image where a plurality of types of character strings are arranged, it is possible to further increase readability of the character strings in the ground tint image. In this case, in addition to omitting the input of setting values by the user, the stamp mark setting screen 50 and the repeat detail setting screen 80 can be omitted. Also in the above mentioned embodiment, since when the user inputs a character string, the ground tint image is automatically created based on each previous input value (in short, the setting file) stored in the HDD 25 even when the user does not input new data related to the arrangement of this character string, it can be said that the same processing as the processing in which the setting file of the above fixed values is used.

In the above mentioned embodiment, in the text detail setting screen 70 (FIG. 3), the user can also directly input a character string in the text display section 73 (or the setting text display section 74), although, in the above mentioned embodiment, there is no particular description about it, and the user selects a predetermined text as a ground tint image. At this time, a space, comma, colon, etc. can be used as a delimiter between character strings. Also, the space, comma, colon, etc. can be handled as character string.

In the above mentioned embodiment, although the ground tint image is generated by cutting out from an image in which character strings are arranged, the generation method is not particularly limited to this, and the ground tint image can be created not being limited to cutting out if a plurality of character strings which are arranged in the arrangement area are used and the ground tint image is generated in an area including the arrangement start line.

In the above mentioned embodiment, although the embodiment is described using the user PC 20 as the image processing apparatus of the present invention, the image processing apparatus is not particularly limited to this if it is an apparatus which instructs printing with the ground tint image attached, and the image processing apparatus can be applied to a multi-function printer equipped with a scanner, a FAX, a game machine, a digital camera, a picture viewer which reproduces an image, a digital video recorder, a mobile phone equipped with a camera, etc. In addition, although the image processing apparatus is described in a form of the user PC 20, it can be a form of a program which executes the above mentioned image processing method.

What is claimed is:

1. An image processing method in which a computer generates a background image where a plurality of character strings are arranged over a plurality of lines, the image processing method comprising:
    (a) a step for setting an arrangement area where the character strings are arranged;
    (b) a step for setting an arrangement start line of the character strings at least within the arrangement area;
    (c) a step for:
        arranging at least one of the character strings from a start position of the arrangement start line in a predetermined direction in a predetermined order to make one of the lines,
        when a character string to be arranged next is outside of the arrangement area set in step (a), arranging the character string to be arranged next from a start position of the arrangement start line of a next one of the lines, and
        when the character string to be arranged next protrudes from the arrangement area, a character string subsequent to the character string to be arranged next is arranged at the top of the next line; and
    (d) a step for generating the background image in an area including the arrangement start line by using the plurality of character strings arranged within the arrangement area in the step (c).

2. The image processing method according to claim 1, wherein in the step (b), the arrangement start line is set at least in a left edge portion of the set arrangement area, and in the step (c), the one of the character strings is set in a rightward direction from the arrangement start line in the left edge portion of the arrangement area as the predetermined direction.

3. The image processing method according to claim 1, wherein in the step (a), the arrangement area is set in a rectangular area based on a size of a main image on which the background image is overlapped.

4. The image processing method according to claim 1, wherein in the step (a), the arrangement area is set in a predetermined width range.

5. The image processing method according to claim 1, wherein:
    the at least one of the character strings comprises a first character string;
    the character string to be arranged next is a second, different character string; and
    the character string subsequent to the character string to be arranged next is selected from the group consisting of: a third, different character string; and the first character string.

6. An image processing method in which a computer generates a background image where a plurality of character strings are arranged over a plurality of lines, the image processing method comprising:
- (a) a step for setting an arrangement area where the character strings are arranged;
- (b) a step for setting an arrangement start line of the character strings at least within the arrangement area;
- (c) a step for:
    - arranging at least one of the character strings from a start position of the arrangement start line in a predetermined direction in a predetermined order to make one of the lines,
    - when a character string to be arranged next is outside of the arrangement area set in step (a), arranging the character string to be arranged next from a start position of the arrangement start line of a next one of the lines, and
    - when the character string to be arranged next protrudes from the arrangement area, if an area of the character string to be arranged next which protrudes from the arrangement area is greater than or equal to a predetermined fraction of a total area of the character string to be arranged next, the character string to be arranged next is arranged at the top of the next line, and if the area of the character string to be arranged next which protrudes from the arrangement area is smaller than the predetermined fraction, a character string subsequent to the character string to be arranged next is arranged at the top of the next line; and
- (d) a step for generating the background image in an area including the arrangement start line by using the plurality of character strings arranged within the arrangement area in the step (c).

7. The image processing method according to claim 1, wherein in the step (c), as the predetermined direction, the character string is arranged in the predetermined direction which is set on the basis of an angle inputted by a user.

8. The image processing method according to claim 1, wherein in the step (b), a position of the arrangement start line is set at least on the basis of an arrangement angle of a character string inputted by a user.

9. The image processing method according to claim 6, wherein:
- the at least one of the character strings comprises a first character string;
- the character string to be arranged next is a second, different character string; and
- the character string subsequent to the character string to be arranged next is selected from the group consisting of:
    - a third, different character string; and
    - the first character string.

10. A recording medium in which a program for generating a background image by using a computer is recorded, the program comprising:
- (a) a step for setting an arrangement area where a plurality of character strings are arranged;
- (b) a step for setting an arrangement start line of the character strings at least within the arrangement area;
- (c) a step for:
    - arranging at least one of the character strings from a start position of the arrangement start line in a predetermined direction in a predetermined order to make one of the lines,
    - when a character string to be arranged next is outside of the arrangement area set in step (a), arranging the character string to be arranged next from a start position of the arrangement start line of a next one of the lines, and
    - when the character string to be arranged next protrudes from the arrangement area, a character string subsequent to the character string to be arranged next is arranged at the top of the next line; and
- (d) a step for generating the background image in an area including the arrangement start line by using the plurality of character strings arranged within the arrangement area in the step (c).

11. The recording medium according to claim 10, wherein:
- the at least one of the character strings comprises a first character string;
- the character string to be arranged next is a second, different character string; and
- the character string subsequent to the character string to be arranged next is selected from the group consisting of:
    - a third, different character string; and
    - the first character string.

12. An image processing apparatus for generating a background image where a plurality of character strings are arranged over a plurality of lines, the image processing apparatus comprising:
- arrangement area setting means for setting an arrangement area where the character strings are arranged;
- line setting means for setting an arrangement start line of the character strings at least within the arrangement area;
- character string arrangement means for:
    - arranging at least one of the character strings from a start position of the arrangement start line in a predetermined direction in a predetermined order to thereby make one of the lines,
    - when a character string to be arranged next is outside of the arrangement area, arranging the character string to be arranged next from a start position of the arrangement start line of a next one of the lines, and
    - when the character string to be arranged next protrudes from the arrangement area, a character string subsequent to the character string to be arranged next is arranged at the top of the next line; and
- image generating means for generating the background image in an area including the arrangement start line by using the character strings arranged within the arrangement area.

13. The image processing apparatus according to claim 12, wherein:
- the at least one of the character strings comprises a first character string;
- the character string to be arranged next is a second, different character string; and
- the character string subsequent to the character string to be arranged next is selected from the group consisting of:
    - a third, different character string; and
    - the first character string.

* * * * *